US008467687B2

(12) United States Patent
Sasaki

(10) Patent No.: US 8,467,687 B2
(45) Date of Patent: Jun. 18, 2013

(54) OPTICAL TRANSMITTER AND OPTICAL OFDM COMMUNICATION SYSTEM

(75) Inventor: Shinya Sasaki, Koganei (JP)

(73) Assignee: Hitachi, Ltd., Tokyo (JP)

( * ) Notice: Subject to any disclaimer, the term of this patent is extended or adjusted under 35 U.S.C. 154(b) by 202 days.

(21) Appl. No.: 13/140,355

(22) PCT Filed: Dec. 18, 2009

(86) PCT No.: PCT/JP2009/071139
§ 371 (c)(1),
(2), (4) Date: Jun. 16, 2011

(87) PCT Pub. No.: WO2010/073990
PCT Pub. Date: Jul. 1, 2010

(65) Prior Publication Data
US 2011/0249978 A1    Oct. 13, 2011

(30) Foreign Application Priority Data
Dec. 22, 2008    (JP) .................. 2008-326034

(51) Int. Cl.
*H04B 10/00*    (2006.01)

(52) U.S. Cl.
USPC ........... 398/141; 398/183; 398/193; 398/203; 398/204

(58) Field of Classification Search
USPC ............... 398/79, 140, 141, 159, 193, 202, 398/203, 204
See application file for complete search history.

(56) References Cited

U.S. PATENT DOCUMENTS 6,621,340 B1 *  9/2003  Perthold et al. ............... 330/149
7,180,368 B2 *  2/2007  Hirose et al. .................. 330/149
(Continued)

FOREIGN PATENT DOCUMENTS

| JP | 10-51416 A | 2/1998 |
| JP | 2003-530729 A | 10/2003 |
| JP | 2008-206064 A | 9/2008 |

OTHER PUBLICATIONS

Wei-Ren Peng et al., "Experimental Demonstration of 340 km SSMF Transmission Using a Virtual Single Sideband OFDM Signal that Employs Carrier Suppressed and Iterative Detection Techniques", OFC/NFOEC 2008, OMU1, USA (Three (3) pages).

(Continued)

*Primary Examiner* — Agustin Bello
(74) *Attorney, Agent, or Firm* — Crowell & Moring LLP

(57) ABSTRACT

Distortion of a reception signal which is attributable to interference between subcarriers during photoelectric conversion is reduced in an optical OFDM communication system without broadening the signal band. A transmission signal processing unit (100) in a transmitter is provided with a distortion generating circuit (distortion generating unit) (170). A subcarrier signal is utilized as an input signal for the circuit. The distortion generating circuit (170) generates a baseband OFDM signal by means of inverse FFT calculation using the input signal, computes the square of the absolute value of the signal, and restores the subcarrier signal by mean of FFT calculation. Because interference between subcarriers is also included in the signal, the distortion element generated by the interference between the subcarriers can be extracted when the difference from the input signal is found. The signal obtained by subtracting the distortion element from the subcarrier signal, which has been modulated using the original data to be communicated, is used as the transmission signal. The transmission signal is photoelectrically converted with a receiver. The interference between subcarriers generated at this time is smaller than when the aforementioned processing is not performed.

10 Claims, 16 Drawing Sheets

U.S. PATENT DOCUMENTS

| | | | | |
|---|---|---|---|---|
| 7,307,569 | B2* | 12/2007 | Vrazel et al. | 341/144 |
| 7,324,437 | B1* | 1/2008 | Czylwik et al. | 370/210 |
| 7,539,125 | B2* | 5/2009 | Kao et al. | 370/208 |
| 7,580,630 | B2* | 8/2009 | Kee et al. | 398/25 |
| 7,623,796 | B2* | 11/2009 | Liu | 398/202 |
| 7,639,754 | B2* | 12/2009 | Choi et al. | 375/267 |
| 7,796,898 | B2* | 9/2010 | Armstrong | 398/193 |
| 7,843,805 | B2* | 11/2010 | Kao et al. | 370/208 |
| 8,107,817 | B2* | 1/2012 | Lin et al. | 398/81 |
| 8,204,377 | B2* | 6/2012 | Liu et al. | 398/65 |
| 8,218,979 | B2* | 7/2012 | Liu | 398/208 |
| 8,233,809 | B2* | 7/2012 | Qian et al. | 398/208 |
| 8,355,637 | B2* | 1/2013 | Sano et al. | 398/204 |
| 2002/0106148 | A1 | 8/2002 | Schemmann et al. | |
| 2004/0232986 | A1* | 11/2004 | Hirose et al. | 330/149 |
| 2005/0184803 | A1* | 8/2005 | Hirose et al. | 330/149 |
| 2005/0271387 | A1* | 12/2005 | Kee et al. | 398/140 |
| 2009/0168641 | A1* | 7/2009 | Kao et al. | 370/208 |
| 2010/0104284 | A1* | 4/2010 | Liu et al. | 398/65 |
| 2010/0247099 | A1* | 9/2010 | Lowery et al. | 398/79 |
| 2011/0249978 | A1* | 10/2011 | Sasaki | 398/140 |
| 2012/0263481 | A1* | 10/2012 | Ip et al. | 398/193 |

OTHER PUBLICATIONS

Wei-Ren Peng et al., "Experimental Demonstration of a Coherently Modulated and Directly Detected Optical OFDM System Using an RF-Tone Insertion", OFC/NFOEC 2008, OMU2, USA (Three (3) pages).

International Search Report including English translation dated Mar. 9, 2010 (Five (5) pages).

Arthur James Lowery et al., "Orthogonal Frequency Division Multiplexing for Adaptive Dispersion Compensation in Long Haul WDM Systems", PDP39, Department of Electrical & Computer Systems Engineering, Australia, 2006 (Three (3) pages).

International Preliminary Report on Patentability including Written Opinion dated Mar. 9, 2010 (seven (7) pages).

* cited by examiner

OPTICAL TRANSMITTER AND OPTICAL OFDM COMMUNICATION SYSTEM

FIELD OF THE INVENTION

The present invention relates to an optical transmitter and an optical OFDM communication system, particularly to an optical transmitter in an optical communication system using a multicarrier, and more particularly to an optical transmitter and an optical OFDM communication system, which reduce an influence of interference between subcarriers in an optical orthogonal frequency division multiplexing (OFDM) communication system using a direct detection receiving system.

BACKGROUND OF THE INVENTION

In an optical communication system put into practical use up to now, a two-level modulation and demodulation technique using light intensity is utilized. Specifically, "0" and "1" of digital information are converted into on-off of intensity of a light at a transmitter side, and transmitted into an optical fiber. The light that has propagated through the optical fiber is subjected to photoelectric conversion at a receiver side to restore original information. In recent years, with explosive growth of the Internet, a communication capacity required for the optical communication system develops dramatically. Up to now, an on-off speed of the light, that is, a modulation speed has increased in response to a request to make the communication capacity be huge. However, a technique in which the modulation speed increases to realize the huge capacity generally suffers from the following problems.

There arises such a problem that a transmittable distance limited by chromatic dispersion of the optical fiber becomes shorter as the modulation speed increases. In general, the transmission distance limited by the chromatic dispersion becomes shorter as the square of a bit rate. That is, when the bit rate doubles, the transmission distance limited by the chromatic dispersion is reduced to ¼. Likewise, there arises such a problem, that when the modulation speed increases, a transmittable distance limited by polarization mode dispersion of the optical fiber becomes shorter. In general, when the bit rate doubles, the transmission distance limited by the polarization mode dispersion is reduced to ½. Influences of the chromatic dispersion will be described specifically. If the bit rate is 10 Gbps, and a normal dispersion fiber is used, the transmission distance limited by the chromatic dispersion is 60 km. However, in a system having the bit rate of 40 Gbps, the transmission distance is shortened to about 4 km. Further, in a next-generation 100 Gbps system, the transmission distance limited by the chromatic dispersion is 0.6 km, and a trunk optical communication system having the transmission distance of about 500 km cannot be realized without any improvement. In order to realize an ultrahigh-high speed trunk communication system, a specific optical fiber such as so-called "dispersion compensating fiber" having a negative chromatic dispersion for cancelling the chromatic dispersion of a transmission channel is currently installed in a repeater or a transceiver. This specific fiber is expensive, and an advanced design such as how long the dispersion compensating fiber is installed at each site (a length of the dispersion compensating fiber) is required. Those factors drive up the price of the optical communication system.

Under the circumstances, in recent years, as an optical modem system that increases the communication capacity, study of the optical communication system using the OFDM technique enters the limelight. In the OFDM technique, respective amplitudes and phases of a large number of sinusoidal waves (called "subcarriers") orthogonal to each other within one symbol time, that is, each having a frequency of the integral multiple of an inverse in one symbol time, are set to given values to carry information (modulate), and a carrier is modulated with a signal bundling those subcarriers and transmitted. The OFDM technique is used in a very high bit rate digital subscriber line (VDSL) system that communicates between a telephone exchange and a home, a power line communication system in the home, and a digital terrestrial television system, and put into practical use. Further, the OFDM technique is scheduled for use in a next-generation cellular phone system.

The optical OFDM communication system is a communication system applying the OFDM technique with light as a carrier. In the OFDM technique, a large number of subcarriers are employed as described above. Further, a multilevel modulation system such as 4-QAM, 8-PSK, or 16-QAM can be applied to a modulation system of each subcarrier. Therefore, one symbol time becomes very longer than an inverse of the bit rate. As a result, the transmission distance limited by the above-mentioned wavelength dispersion or polarization mode dispersion becomes sufficiently longer than a transmission distance (for example, 500 km in a domestic trunk system) assumed in the optical communication system, thereby making the above-mentioned dispersion compensating fiber unnecessary. As a result, there is a possibility that the optical communication system can be realized at the low costs. As a specific numerical example, let us consider a case in which the optical communication system having the bit rate of, for example, 10 Gbps is realized by the optical OFDM technique. When it is assumed that the number of sub-carriers is 10, and the modulation of each subcarrier is 4-QAM, one symbol speed is 500 MBaud. The transmission distance limited by the chromatic dispersion in this case becomes $(10/0.5)^2 = 400$ times of a related-art on-off keying (OOK) system that conducts on-off modulation in the optical communication system of 10 Gbps, that is, 24000 km. Thus, the domestic trunk system having the transmission distance 500 km can be realized without using the expensive dispersion compensating fiber, and the low-cost optical communication system can be realized.

The optical OFDM communication system can be classified into two types according to a receiving scheme of an optical signal. One type is a direct detection receiving scheme, and the other type is a coherent receiving system. The present invention relates to an optical OFDM communication system using the direct detection receiving scheme.

The configuration diagram of this system is illustrated in FIG. 3. When data to be originally communicated is input to a transmitter 1 from an input terminal 9, the data is converted into a baseband OFDM signal in a transmission signal processor 100 within the transmitter 1. The converted signal is amplified by a driver amplifier 2, and carried on a light, which is a carrier, by an optical modulator 4 to generate an optical OFDM signal. The optical OFDM signal passes through an optical fiber 5, which is a transmission channel, and arrives at a receiver 6. The optical OFDM signal is received by direct detection by a photodiode 7, and converted into an electric signal. The electric signal is ideally the above-mentioned baseband OFDM signal, and the signal is amplified by a preamplifier 8, demodulated to data to be originally communicated, by a reception signal processor 200, and output from an output terminal 10.

A functional configuration diagram of the transmission signal processor 100 is illustrated in FIG. 5, and a functional configuration diagram of the reception signal processor 200 is illustrated in FIG. 6. The data to be communicated is first converted into 2N parallel data by a serial-parallel converter 110. In this example, N is the number of subcarriers for carrying data. If the modulation of the subcarriers is 4-QAM, 2N pieces of parallel data are obtained. For example, in a case of 16-QAM, 4N pieces of data are obtained. That is, serial data is converted into "(the number of bits per one symbol)× (the number of subcarriers)" pieces of parallel data. A subcarrier modulator 120 modulates N subcarriers with the parallel data. The modulated subcarriers are converted into time data by an inverse FFT unit 130, and converted into serial data by a parallel-serial converter 140. A cyclic prefix is inserted into the serial data by a cyclic prefix insertion unit 150, and the signal passes through a DA converter 160, and is sent to a driver amplifier as an analog signal.

In the reception signal processor 200, a reception electric signal amplified by the preamplifier is converted into a digital signal by an AD converter 210. The cyclic prefix is removed from the digital signal by a cyclic prefix removing unit 220, and the signal is converted into N parallel data by a serial-parallel converter 230. The parallel data is separated into N subcarrier signals in an FFT unit 240, and data carried by each subcarrier is demodulated by a subcarrier demodulator 250, and converted into serial data by a parallel-serial converter 260.

A spectrum of the optical OFDM signal that propagates through the optical fiber 5 is conducted by using a single sideband wave modulation system for the purpose of avoiding an influence of chromatic dispersion in the optical fiber. An optical spectrum of the optical OFDM signal in this case is illustrated in FIG. 8. Subcarrier signals are arrayed at a higher frequency side of the carrier of light (the subcarriers may be arrayed at a lower frequency side). The optical spectrum of the optical OFDM signal has plural subcarrier signals arrayed at regular intervals each of which is an inverse $\Delta$ of one symbol time Ts. A signal band B occupied by the optical OFDM signal is about N×$\Delta$ assuming that the number of subcarriers is N. When the signal is received by direct detection, beat signals between the adjacent subcarriers occur due to direct detection conducted by the photodiode 7, that is, photoelectric conversion. The beat signals interfere with the subcarrier signals to be originally received, to thereby distort a reception signal. As a result, a receiving sensitivity is deteriorated.

Up to now, this problem (hereinafter referred to as "sensitivity deterioration by inter-subcarrier interference (ICI)") is solved by, for example, the following four solution techniques.

A first technique is a guard band system disclosed in Non-patent literature 1, for example. A schematic diagram of a spectrum of a baseband OFDM signal generated in this system, and a schematic diagram of a spectrum of a reception electric signal occurring when the baseband OFDM signal is received by direct detection are illustrated in FIGS. 10A and 10B, respectively. In this system, the subcarrier signals carrying the signal to be originally communicated are separated from direct current by a signal band B to provide a guard band. The signal is converted into an optical OFDM signal and transmitted, and directly detected. The inter-subcarrier interference (ICI) is generated between the direct current and the signal band B, and the interfered subcarriers are separated in frequency domain from the subcarriers carrying data to be originally communicated, and do not interfere with the latter.

A second technique is a guard band system illustrated in Non-patent literature 2. In this system, the guard band is provided to the spectrum of the base band OFDM signal as in the first solution. However, in this technique, a bias point of the optical modulator 4 is set to a zero point (transmittance null) of a so-called "transmission characteristics" where no lightwave carrier occurs. A certain frequency (for example, −fc) component of the baseband is used as a carrier, and the guard band is set for the signal band B of the carrier whereby the subcarriers carrying the signal are arrayed at the higher frequency side. A schematic diagram of the spectrum of a specific baseband OFDM signal, and a spectrum of an electric signal when the signal is optically transmitted, and directly received are illustrated in FIGS. 11A and 11B, respectively. A difference between this technique and the above first technique resides in that the spectrum of the baseband OFDM signal is shifted by −fc. Accordingly, the spectrums of the electric signals received by direct detection are identical with each other (refer to FIGS. 10B and 11B).

A third technique is disclosed likewise in Non-patent literature 2. In this solution, the guard bands according to the first and second techniques are arrayed between the subcarriers carrying the signal. Specific frequency layouts are illustrated in FIGS. 12A and 12B. In a spectrum of the baseband OFDM signal at the transmitter side illustrated in FIG. 12A, each interval between the adjacent subcarriers carrying the signal is spaced by 2×$\Delta$. This signal is converted into the optical OFDM signal, and transmitted. An electric signal spectrum generated by receiving the signal by direct detection is illustrated in FIG. 12B. The inter-subcarrier interference (ICI) is generated between the adjacent subcarrier components carrying the signal, and no interference with the signal occurs.

A fourth technique is disclosed in Non-patent literature 3. A spectrum of the optical OFDM signal is illustrated in FIG. 8. In this technique, in a receiver, after normal signal processing is conducted to decode the subcarriers, a distortion component attributable to the inter-subcarrier interference is generated by signal processing with the use of the decoded data, and an influence of the inter-subcarrier interference is reduced by subtracting the distortion component from the received signal.

Non-patent literature 1: A. J. Lowery, L. Du, and J. Armstrong, "Orthogonal frequency division multiplexing for adaptive dispersion compensation in long haul WDM systems", OFC2006, postdeadline papers, PDP39, 2006

Non-patent literature 2: W. Peng, X. Wu, and V. R. Arbab, et al, "Experimental demonstration of a coherently modulated and directly directed optical OFDM systems using an RF-tone insertion", OFC2008, OMU2, 2008

Non-patent literature 3: W. Peng, X. Wu, V. R. Arbab, et al, "Experimental demonstration of 340 km SSMF transmission using a virtual single sideband OFDM signal that employs carrier suppressed and iterative detection techniques", OFC 2008, OMU1, 2008

DISCLOSURE OF INVENTION

Problems to be Solved

However, in the first to third techniques, the band of the transmission signal is widened twice as large as the band B originally provided to the signal with the use of the guard band. As a result, when the optical OFDM transmission technique is applied to a wavelength division multiplexing system, there arises such a problem that a total transmission capacity that can be transmitted by one optical fiber is halved. Also, in the above fourth technique, because the distortion component attributable to the inter-subcarrier interference is extracted from a signal obtained by demodulating the reception signal, there arises such a problem that the distortion component is extracted with the use of a false demodulated signal caused by noise, and an accurate distortion component cannot be extracted.

The present invention has been made in view of the above circumstances, and therefore one object of the present invention is to provide an optical transmitter that can reduce distortion of a reception signal caused by inter-subcarrier interference without any influence of noise in a transmission channel or a receiver, and can reduce deterioration of a receiving sensitivity in an optical OFDM communication system using a direct detection receiving system, and the optical OFDM communication system. Another object of the present invention is to conduct communication while keeping a spectrum bandwidth of an optical OFDM signal to an original signal bandwidth B. Still another object of the present invention is increase a transmission capacity that can be communicated by one optical fiber twice as large as a related-art optical OFDM communication system using a guard band when realizing a wavelength division multiplexing communication system using the above technique. Yet still another object of the present invention is to reduce an influence of the inter-subcarrier interference caused by photoelectric conversion not depending on an individual variability in the characteristics of devices used in the optical OFDM communication system, such as a photodiode, an optical modulator, a driver amplifier, or a preamplifier, a characteristic change attributable to a change in the environments such as temperature, and a change with time.

Means to Solve the Problems

In the present invention, a distortion component attributable to the inter-subcarrier interference occurring at the photoelectric conversion is generated by a transmission signal processor, and the distortion component is subtracted from subcarrier signals carrying data to be communicated for transmission. An optical spectrum of the optical OFDM signal according to the present invention is illustrated in FIG. 8 likewise. A one-side spectrum of a baseband OFDM signal is illustrated in FIG. 9. The solution to the problems will be described in more detail below.

A distortion generator circuit (distortion generator) is disposed in a transmission signal processor within a transmitter, and a subcarrier signal modulated with data is used as an input signal for the distortion generator circuit. The distortion generator generates a baseband OFDM signal through inverse FFT computation with the use of the input signal, computes a square of an absolute value of the baseband OFDM signal for conducting the same operation as that of the photoelectric conversion, and returns to the subcarrier signal through FFT computation. Since the subcarrier signal also includes the inter-subcarrier interference generated by photoelectric conversion, a distortion component generated by the inter-subcarrier interference is extracted by taking a difference between the subcarrier signal and the input signal, that is, a signal to be communicated. An output of the distortion generator is the distortion component of each subcarrier. A signal obtained by subtracting the distortion component from the subcarrier signal modulated with data to be originally communicated is set as a transmission signal. In this situation, the transmission signal is transmitted in a distorted state. However, when the transmission signal is subjected to photoelectric conversion by a photodiode in the receiver, the inter-subcarrier interference of a resultantly generated electric signal becomes small as compared with a case in which the above signal processing is not conducted.

A distortion generation mechanism and removal of the distortion according to the present invention will be described below with reference to formulae. An electric field of the optical OFDM signal in FIG. 8 is represented by the following formula.

[equation 1]

$$E(t) = \left[c_0 + \sum_{k=1}^{N} c_k \exp(j2\pi k \Delta t)\right] \cdot \exp(j2\pi f_0 t) \quad \text{formula (1)}$$

where $c_0$ is a carrier amplitude of light, $c_k$ is a modulation component (for example, 4-QAM) of each subcarrier, $\Delta$ is a frequency difference of the subcarrier, and $f_0$ is a carrier frequency of light.

When this signal is received by direct detection, a photocurrent is represented by the following formula (2).

[equation 2]

$$\begin{aligned}i(t) &= R \cdot |E(t)|^2 \quad \text{formula (2)}\\ &= R \cdot \left[\begin{array}{l} |c_0|^2 + \sum_{k=1}^{N} |c_k|^2 + c_0^* \cdot \sum_{k=1}^{N-1}(c_k + \delta_k) \cdot \\ \exp(j2\pi k \Delta t) + c_0 \cdot \sum_{k=1}^{N-1}(c_k^* + \delta_k^*) \cdot \exp(-i2\pi k \Delta t) + \\ c_0 \cdot c_N^* \cdot \exp(-j2\pi N t) + c_0^* \cdot c_N \cdot \exp(j2\pi N t) \end{array}\right]\end{aligned}$$

where R is a responsivity including a quantum efficiency of a photodiode and an optical coupling efficiency of an optical fiber and the photodiode, and * is a complex conjugate. Also, $\delta_k$ is given by the following formula.

[equation 3]

$$\delta_k = \frac{1}{c_0^2} \cdot \sum_{k'=k+1}^{N} c_{k'} \cdot c_{k'-k}^*, (k = 1, 2, \ldots N - 1) \quad \text{formula (3)}$$

As understood from Formula (2), an original signal $c_k$ to be communicated as well as an excess component of $\delta_k$ occur in the photocurrent received by direct detection. From Formula (3), it is understood that the excess component is a sum of beat signals between the respective carriers. The excess component is a distortion component generated by the direct detection reception.

According to the present invention, for example, the distortion component $\delta_k$ is generated in the distortion generator circuit within the transmitter, and subtracted from the information signal $c_k$ to be originally transmitted, thereby suppressing the distortion component to a small value.

For facilitation of understanding, the number of subcarriers (N) is limited to 2, and an operation principle of the present invention will be described below. A signal V(t) obtained by modulating each subcarrier and thereafter converting the modulated subcarrier into a serial signal within the transmitter is represented by the following formula.

[equation 4]

$$V(t)=c0+c_1 \cdot \exp(j2\pi \Delta t)+c_2 \cdot \exp(j2\pi 2\Delta t) \quad \text{formula (4)}$$

This signal V(t) is subjected to square-law detection, and represented by the following formula.

[equation 5]

$$|V(t)|^2 = |c_0|^2 + |c_1|^2 + |c_2|^2 + c_0^* \cdot (c_1+\delta_1) \cdot \exp(j2\pi\Delta t) + c_0 \cdot (c_1^* + \delta_1^*) \cdot \exp(-j2\pi\Delta t) + c_0^* \cdot c_2 \cdot \exp(j2\pi 2\Delta t) + c_0 \cdot c_2^* \cdot \exp(-j2\pi 2\Delta t) \quad \text{formula (5)}$$

In this formula, a component of the frequency $\Delta$ includes $c_1$ as well as a distortion component $\delta_1$. The distortion component $\delta_1$ is represented by the following formula.

[equation 6]

$$\delta_1 = \frac{1}{c_0^*} \cdot c_2 \cdot c_1^* \quad \text{formula (6)}$$

From this formula, it is found that the distortion equation (3) caused by the inter-subcarrier interference generated by direct detection reception, which is obtained in Formula (3) is generated.

This distortion component $\delta_1$ is subtracted from the signal $c_1$ to be originally transmitted as information. It is assumed that a signal resulting from subtracting the distortion is $d_1$.

[equation 7]

$$d_1 = c_1 - \delta_1 \quad \text{formula (7)}$$

Since a signal $c_2$ is not distorted, $d_2 = c_2$ is met. The optical OFDM communication is conducted with the use of a distorted signal $(d_1, d_2)$. The optical OFDM signal in this case is represented by the following formula. That is,

[equation 8]

$$E(t) = \left[c_0 + \sum_{k=1}^{2} d_k \exp(j2\pi k \Delta t)\right] \cdot \exp(j2\pi f_0 t) \quad \text{formula (8)}$$

A photocurrent obtained by receiving the optical OFDM signal by direct detection is represented by the following formula.

[equation 9]

$$i(t) = R \cdot |E(t)|^2 \quad \text{formula (9)}$$

$$= R \cdot \begin{bmatrix} |c_0|^2 + \sum_{k=1}^{2} |d_k|^2 + c_0^* \cdot \left(d_1 + \frac{d_2 \cdot d_1^*}{c_0^*}\right) \cdot \\ \exp(j2\pi\Delta t) + c_0 \cdot \left(d_1^* + \frac{d_2^* \cdot d_1}{c_0}\right) \cdot \exp(-i2\pi\Delta t) + \\ c_0 \cdot d_2^* \cdot \exp(-j2\pi 2t) + c_0^* \cdot d_2 \cdot \exp(j2\pi 2t) \end{bmatrix}$$

A component of the frequency $\Delta$ is represented by the following formula by using Formulae (6) and (7).

[equation 10]

$$d_1 + \frac{d_2 \cdot d_1^*}{c_0^*} = c_1 - \delta_1 + \frac{c_2}{c_0^*} \cdot (c_1^* - \delta_1^*) \quad \text{formula (10)}$$

$$= c_1 - \delta_1 + \delta_1 - \frac{|c_2|^2}{|c_0|^2} \cdot c_1$$

$$= c_1 \cdot \left(1 - \frac{|c_2|^2}{|c_0|^2}\right)$$

The distortion component $\delta_1$ is surely eliminated. In general, $|c_0|^2 \gg |c_2|^2$ is met, and the above formula is substantially equal to $c_1$. This is a principle of the present invention.

A smaller component $|c_2|^2/|c_0|^2$ on a right side of Formula (10) cannot be ignored as the number of subcarriers is increased. For that reason, the distortion is generated on the transmitter side several times, and the distortion is subtracted from the original transmission signal several times to transmit the signal with the result that the smaller distortion component can be further canceled. This is also the feature of the present invention. Also, the number of repeating the generation of the distortion may be controlled by the aid of a switch.

As is understood from formula (10), cancellation of the distortion component by predistortion according to the present invention does not depend on R in Formula (2). That is, the present invention operates not directly depending on the characteristics of the receiver, for example, a quantum efficiency of a photodiode, and an optical coupling efficiency of the optical fiber and the photodiode. Also, that the present invention does not depend on the characteristics of the devices in the transmitter, for example, an operating point and driving amplitude of the modulator is apparent from the above principle description.

According to the first solving means of this invention, there is provided an optical transmitter in an optical OFDM communication system in which the optical transmitter maps digital data to a plurality of subcarriers orthogonal to each other over a symbol time, modulates subcarrier signals, and transmits modulated subcarrier signals as optical signals through an optical fiber, and an optical receiver applies a photoelectric conversion to the optical signals propagated through the optical fiber by a photodiode to receive the optical signals by a direct detection, and demodulates the subcarrier signals to reproduce original digital data, the optical transmitter comprising:

a modulator that maps the digital data to the plurality of subcarriers orthogonal to each other over the symbol time, modulates the subcarrier signals, and outputs the modulated subcarrier signals, a distortion generator that applies an inverse FFT computation to the subcarrier signals to generate a baseband OFDM signal, and squares an absolute value of the baseband OFDM signal to generate a distortion component caused by inter-subcarrier interference;

a subtractor that subtracts the distortion component generated by the distortion generator from each of the subcarrier signals output from the modulator to obtain a transmission signal;

an inverse FFT unit that applies the inverse FFT computation to the transmission signal which is subtracted the distortion component to convert the transmission signal into a time signal; and a transmitter that transmits the optical signal based on the transmission signal converted by the inverse FFT unit to the optical receiver through the optical fiber.

Moreover, in the optical transmitter described above, the optical transmitter further comprises:

a second distortion generator that applies the inverse FFT computation to the transmission signal obtained by the subtractor to generate the baseband OFDM signal, squares the absolute value of the baseband OFDM signal to generate a second distortion component caused by inter-subcarrier interference of the transmission signal; and a third subtractor that subtracts the second distortion component generated by the second distortion generator from an output of the subtractor to obtain the transmission signal, wherein the inverse FFT unit applies the inverse FFT computation to the transmission signal which are subtracted the distortion component and the second distortion component to convert the transmission signal into a time signal.

According to the second solving means of this invention, there is provided an optical transmitter in an optical OFDM communication system in which the optical transmitter maps digital data to a plurality of subcarriers orthogonal to each other over a symbol time, modulates subcarrier signals, and transmits modulated subcarrier signals as optical signals through an optical fiber, and an optical receiver applies a photoelectric conversion to the optical signals propagated through the optical fiber by a photodiode to receive the optical signals by direct detection, and demodulates the subcarrier signals to reproduce original digital data, the optical transmitter comprising:

a modulator that maps the digital data to the plurality of subcarriers orthogonal to each other over the symbol time, modulates the subcarrier signals, and outputs the modulated subcarrier signals, a predistortion unit that generates a transmission signal from which a distortion component caused by inter-subcarrier interference is subtracted;

an inverse FFT unit that applies an inverse FFT computation to the transmission signal to generate a baseband OFDM signal;

a transmitter that transmits the optical signal based on the baseband OFDM signal generated by the inverse FFT unit to the optical receiver through the optical fiber;

a first switch that selects any one of an output of the modulator and an output of the predistortion unit, and guides selected output to an input of the predistortion unit;

a second switch that selectively guides the output of the predistortion unit to any one of an input of the inverse FFT unit and the input of the predistortion unit; and a switch controller that switches the first and second switches, wherein the predistortion unit guides a signal input through the first switch to a distortion generator that squares an absolute value of the signal to generate the distortion component, and subtracts an output of the distortion generator from input signal of the predistortion unit to generate a new transmission signal.

According to the third solving means of this invention, there is provided an optical OFDM communication system comprising:

an optical transmitter that maps digital data to a plurality of subcarriers orthogonal to each other over a symbol time, modulates subcarrier signals, and transmits modulated subcarrier signals as optical signals through an optical fiber; and an optical receiver that applies a photoelectric conversion to the optical signals propagated through the optical fiber by a photodiode to receive the optical signals by a direct detection, and demodulates the subcarrier signals to reproduce original digital data, wherein the optical transmitter comprises:

a modulator that maps the digital data to the plurality of subcarriers orthogonal to each other over the symbol time, modulates the subcarrier signals, and outputs the modulated subcarrier signals, a distortion generator that applies an inverse FFT computation to the subcarrier signals to generate a baseband OFDM signal, and squares an absolute value of the baseband OFDM signal to generate a distortion component caused by inter-subcarrier interference;

a subtractor that subtracts the distortion component generated by the distortion generator from each of the subcarrier signals output from the modulator to obtain a transmission signal;

an inverse FFT unit that applies the inverse FFT computation to the transmission signal which is subtracted the distortion component to convert the transmission signal into a time signal; and a transmitter that transmits the optical signal based on the transmission signal converted by the inverse FFT unit to the optical receiver through the optical fiber.

Moreover, in the optical OFDM communication system described above, the optical OFDM communication system further comprises:

a second distortion generator that applies the inverse FFT computation to the transmission signal obtained by the subtractor to generate the baseband OFDM signal, squares the absolute value of the baseband OFDM signal to generate a second distortion component caused by inter-subcarrier interference of the transmission signal; and a third subtractor that subtracts the second distortion component generated by the second distortion generator from an output of the subtractor to obtain the transmission signal, wherein the inverse FFT unit applies the inverse FFT computation to the transmission signal which are subtracted the distortion component and the second distortion component to convert the transmission signal into a time signal.

According to the fourth solving means of this invention, there is provided an optical OFDM communication system comprising:

an optical transmitter that maps digital data to a plurality of subcarriers orthogonal to each other over a symbol time, modulates subcarrier signals, and transmits modulated subcarrier signals as optical signals through an optical fiber; and an optical receiver that applies a photoelectric conversion to the optical signals propagated through the optical fiber by a photodiode to receive the optical signals by direct detection, and demodulates the subcarrier signals to reproduce original digital data, wherein the optical transmitter comprises:

a modulator that maps the digital data to the plurality of subcarriers orthogonal to each other over the symbol time, modulates the subcarrier signals, and outputs the modulated subcarrier signals, a predistortion unit that generates a transmission signal from which a distortion component caused by inter-subcarrier interference is subtracted;

an inverse FFT unit that applies an inverse FFT computation to the transmission signal to generate a baseband OFDM signal;

a transmitter that transmits the optical signal based on the baseband OFDM signal generated by the inverse FFT unit to the optical receiver through the optical fiber;

a first switch that selects any one of an output of the modulator and an output of the predistortion unit, and guides selected output to an input of the predistortion unit;

a second switch that selectively guides the output of the predistortion unit to any one of an input of the inverse FFT unit and the input of the predistortion unit; and a switch controller that switches the first and second switches, wherein the predistortion unit guides a signal input through the first switch to a distortion generator that squares an absolute value of the signal to generate the distortion component, and subtracts an output of the distortion generator from input signal of the predistortion unit to generate a new transmission signal.

Advantage

According to the present invention, it is possible to provide an optical transmitter that can reduce distortion of a reception signal caused by inter-subcarrier interference without any influence of noise in a transmission channel or a receiver, and can reduce deterioration of a receiving sensitivity in an optical OFDM communication system using a direct detection receiving system, and the optical OFDM communication system. Moreover, according to the present invention, it is possible to conduct communication while keeping a spectrum bandwidth of an optical OFDM signal to an original signal bandwidth B. Thus, it is possible to increase a transmission capacity that can be communicated by one optical fiber twice as large as a related-art optical OFDM communication system using a guard band when realizing a wavelength division multiplexing communication system using the above technique. Still further, according to the present invention, there is an advantage that can reduce an influence of the inter-subcarrier interference caused by photoelectric conversion not depending on an individual variability in the characteristics of devices used in the optical OFDM communication system, such as a photodiode, an optical modulator, a driver amplifier, or a preamplifier, a characteristic change attributable to a change in the environments such as temperature, and a change with time and, it is possible to be widely and generally applied.

EMBODIMENT OF THE INVENTION

Hereinafter, embodiments will be described with reference to FIGS. 1 to 4, 7, 8, and 13 to 16.

1. First Embodiment

A first embodiment will be described with reference to FIG. 1. In this example, for description, it is assumed that modulation of subcarriers is 4-QAM. However, this embodiment is not limited to this modulation, but is applicable to an arbitrary subcarrier modulation system. Also, it is assumed that the number of subcarriers is N (N is an integer).

Figure 3:
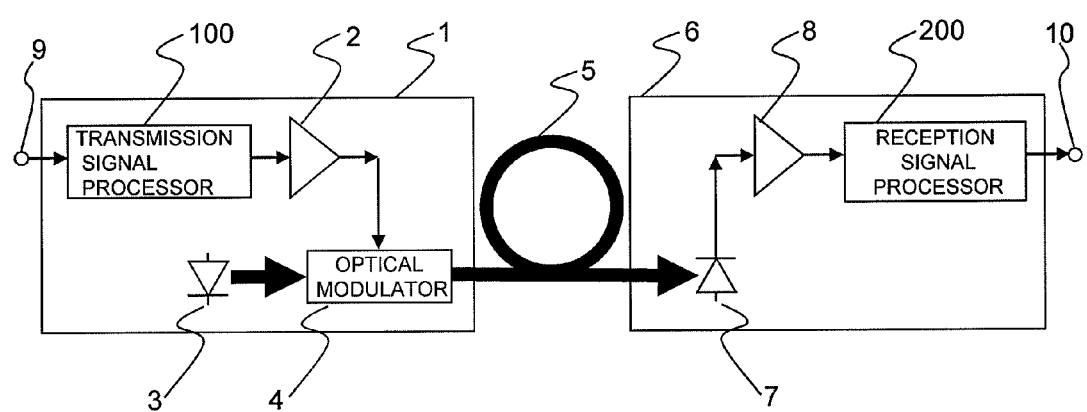
FIG. 3 is a configuration diagram of an optical OFDM communication system using an optical modulator.

FIG. 3 illustrates a configuration diagram of an optical OFDM communication system.

Figure 4:
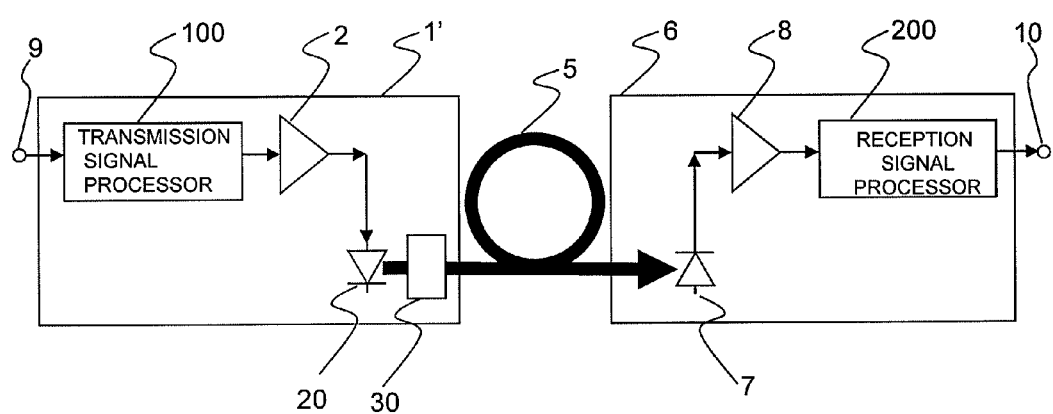
FIG. 4 is a configuration diagram of the optical OFDM communication system using direct modulation of a laser.
Figure 5:
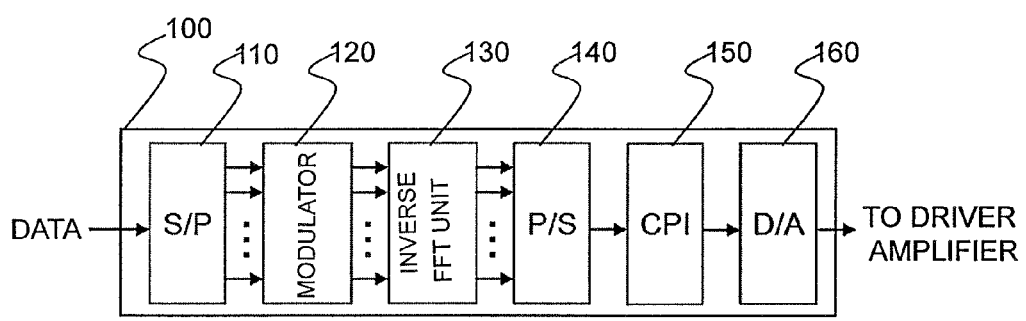
FIG. 5 is a functional block diagram of a transmission signal processor in a related-art optical OFDM communication system.

The optical OFDM communication system includes, for example, a transmitter (optical transmitter) 1, an optical fiber 5, and a receiver (optical receiver) 6. The transmitter 1 includes, for example, a transmission signal processor 100, a driver amplifier 2, a laser 3, and an optical modulator 4. The transmitter 1 may include an input terminal 9. The receiver 6 includes, for example, a photodiode 7, a preamplifier 8, and a reception signal processor 200. The receiver 6 may include an output terminal 10. The transmitter 1 and the receiver 6 are connected to each other via the optical fiber 5. The transmitter 1 may include, for example, a direct modulation semiconductor laser 20 and an optical filter 30 instead of the laser 3 and the optical modulator 4 as illustrated in FIG. 4. In this embodiment, the driver amplifier 2, the laser 3, and the optical modulator 4 may be called "transmitter".

Figure 1:
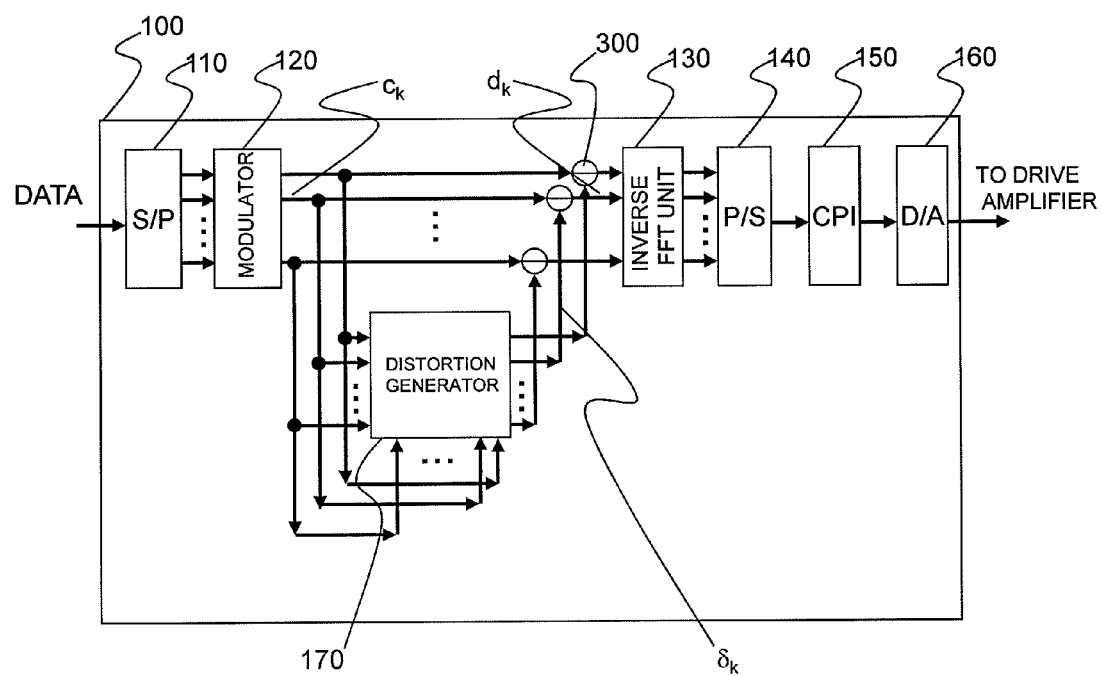
FIG. 1 is a functional block diagram of a transmission signal processor within a transmitter according to a first embodiment.

FIG. 1 is a configuration diagram of the transmission signal processor 100 according to a first embodiment.

The transmission signal processor 100 includes, for example, a serial-parallel converter (S/P) 110, a subcarrier modulator 120, an inverse Fourier transform unit (inverse FFT unit) 130, a parallel-serial converter (P/S) 140, a cyclic prefix insertion unit (CPI) 150, a digital-analog converter (DA converter) 160, a distortion generator 170, and subtractors 300.

Data to be originally communicated is converted into 2N parallel data by the serial-parallel converter 110. The subcarrier modulator 120 modulates N subcarriers with the use of the parallel data. The modulated subcarriers ($c_k$, k=1, 2, ... N) are divided into three signals, and two signals among those three signals become input signals of the distortion generator 170. Each output signal ($\delta_k$, k=1, 2, N) of the distortion generator 170 is subtracted from the remaining signal by the subtractors 300, and results ($d_k$, k=1, 2, N) are input to the inverse FFT unit 130. The input signals are converted into time data by the inverse FFT unit 130, and then converted into serial data by the parallel-serial converter 140. A cyclic prefix is inserted into the serial data by the cyclic prefix insertion unit 150, and the serial data passes through the DA converter 160, and is sent to the driver amplifier 2 as an analog signal.

Figure 6:
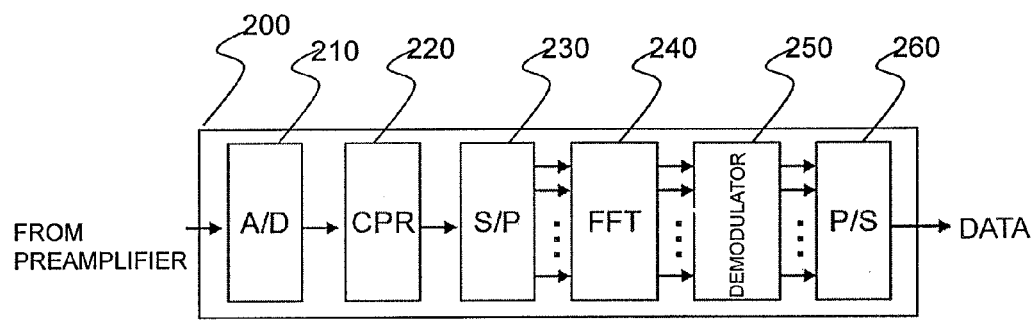
FIG. 6 is a functional block diagram of a reception signal processor in the related-art optical OFDM communication system.

After the signal has been amplified by the driver amplifier 2 in FIG. 3, the signal is modulated into an optical OFDM signal with a laser beam from the laser 3 as a carrier by the optical modulator 4. The optical OFDM signal is output to the optical fiber 5 from the transmitter 1. The optical OFDM signal is input to the receiver 6 through the optical fiber 5 which is a transmission channel. The optical OFDM signal is converted into an electric signal by photoelectric conversion of the photodiode 7. After the electric signal is amplified by the preamplifier 8, the electric signal is demodulated by the reception signal processor 200, and extracted from the output terminal 10 as serial data. The configuration of the reception signal processor 200 is, for example, the same as the configuration illustrated in FIG. 6, and a normal OFDM signal processing configuration can be used for the reception signal processor 200.

Figure 2:
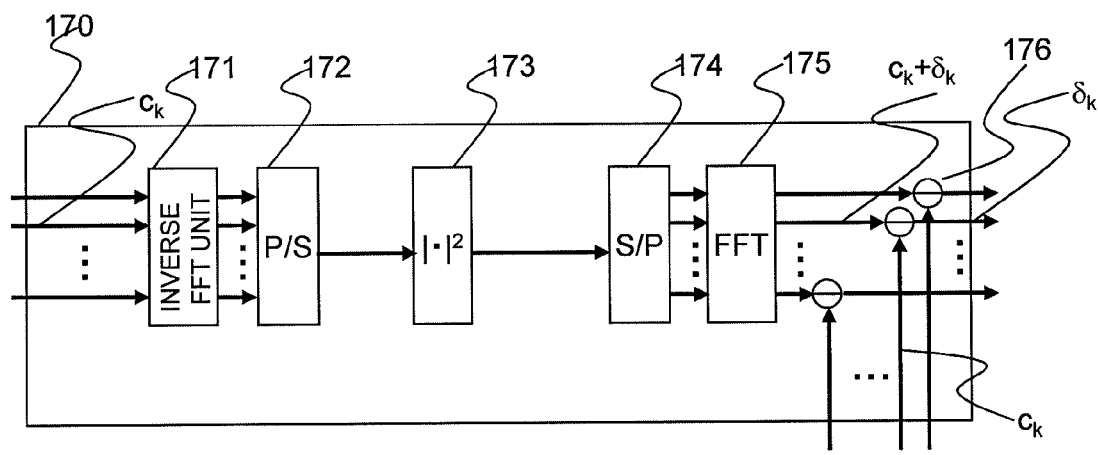
FIG. 2 is a functional block diagram of a distortion generator of the transmission signal processor within the transmitter according to the first embodiment.

FIG. 2 illustrates a configuration diagram of the distortion generator 170 according to this embodiment.

The distortion generator 170 includes, for example, an inverse FFT unit 171, a parallel-serial converter (P/S) 172, a squaring unit 173, a serial-parallel converter (S/P) 174, a Fourier converter (FFT) unit 175, and subtractors 176.

Parts of the output signals ($c_k$, k=1, 2, ... N) of the subcarrier modulator 120 in FIG. 1 are input to the distortion generator 170. The input signals are converted into time signals by the inverse FFT unit 171, and converted into serial data by the parallel-serial converter 172. The serial data is basically a baseband OFDM signal per se. Then, the signal is converted into an absolute value and squared by the squaring unit 173 that conducts the same action as photoelectric conversion of the photodiode to generate a reception electric signal including inter-subcarrier interference. The reason that the absolute value is obtained is because the baseband OFDM signal is generally a complex number. This signal is converted into parallel data by the serial-parallel converter 174, and the parallel data is separated into subcarriers by the FFT unit 175. Outputs of the FFT unit 175 are signals ($c_k+\delta_k$, k=1, 2, ... N) including distortion components attributable to the inter-subcarrier interference generated by photoelectric conversion. Therefore, the subcarrier signals ($c_k$, k=1, 2, ... N) modulated by data to be originally communicated, that is, the input signals of the distortion generating circuit 170 are subtracted from the signals output from the FFT unit 175 by the subtractors 176, thereby enabling the output of the distortion components ($\delta_k$, k=1, 2, ... N).

Results of evaluating the effects of this embodiment through simulation will be described below. The simulation is implemented with the use of the following parameters. That is, the number of subcarriers is 128, the modulation of each subcarrier is 4-QAM, the number of symbols is 256, and data is PN15 pseudo random signals of independent two series. The magnitude of distortion attributable to the inter-subcarrier interference is evaluated by an error vector magnitude (EVM). Since the simulation does not take noise in the transmission channel and noise within the receiver into consideration, the EVM purely expresses the distortion of the reception signal attributable to the inter-subcarrier interference. Accordingly, the inter-subcarrier interference is smaller as the EVM is smaller, and the receiving sensitivity is improved.

Figure 15:
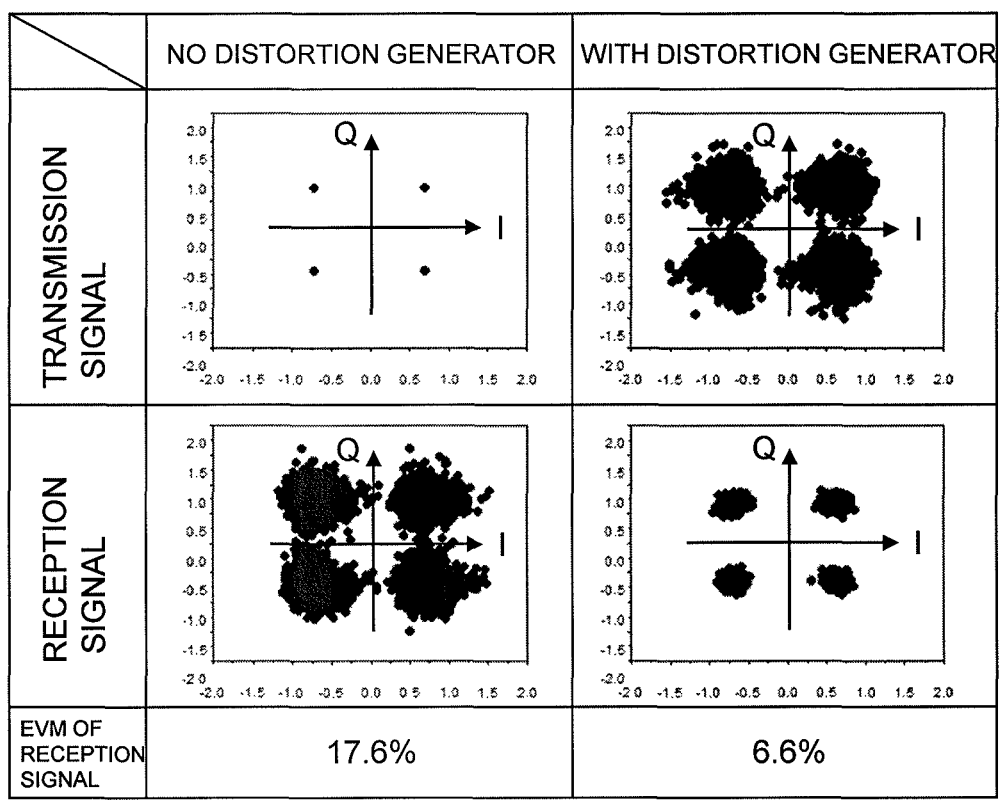
FIG. 15 is a distribution diagram of signal points of transmission and reception signals on an IQ plane according to the first embodiment.

FIG. 15 illustrates the simulation results together.

FIG. 15 represents signal point arrangement of the subcarriers of the transmission and reception signals on an IQ plane. When no distortion generator is provided, the signal point arrangement in the normal optical OFDM communication to which this embodiment is not applied is represented. In this case, the signal point arrangement of the transmission signal represents the signal point arrangement of data to be originally communicated. If this arrangement is represented as the signal point arrangement of the reception signal, an ideal communication without any distortion can be realized. The signal point arrangement when this signal is received by a direct detection receiving system is represented in FIG. 15 as the reception signal without the distortion generator. It is understood from this table that the signal points are spread and distributed on the IQ plane due to the inter-subcarrier interference caused by photoelectric conversion in direct detection. The calculated EVM of the reception signal is 17.6%.

Subsequently, simulation results according to this embodiment will be described. This is illustrated in a column indicative of "with distortion generator" in FIG. 15. The signal point arrangement of the transmission signal is represented by signals ($d_k$) after distortion generated by the distortion generator is subtracted from the transmission signal, which is very different from the signal point arrangement of the signal to be originally communicated. However, in the signal point arrangement of the signals received by the receiver of the direct detection receiving system, spreading of the signal points becomes smaller as represented by the reception signal with the distortion generator of FIG. 15. The EVM really calculated is reduced to 6.6%, and the effects of this embodiment can be quantitatively confirmed.

This embodiment has, for example, a feature that distortion attributable to the inter-subcarrier interference can be generated by digital signal processing.

2. Second Embodiment

Figure 7:
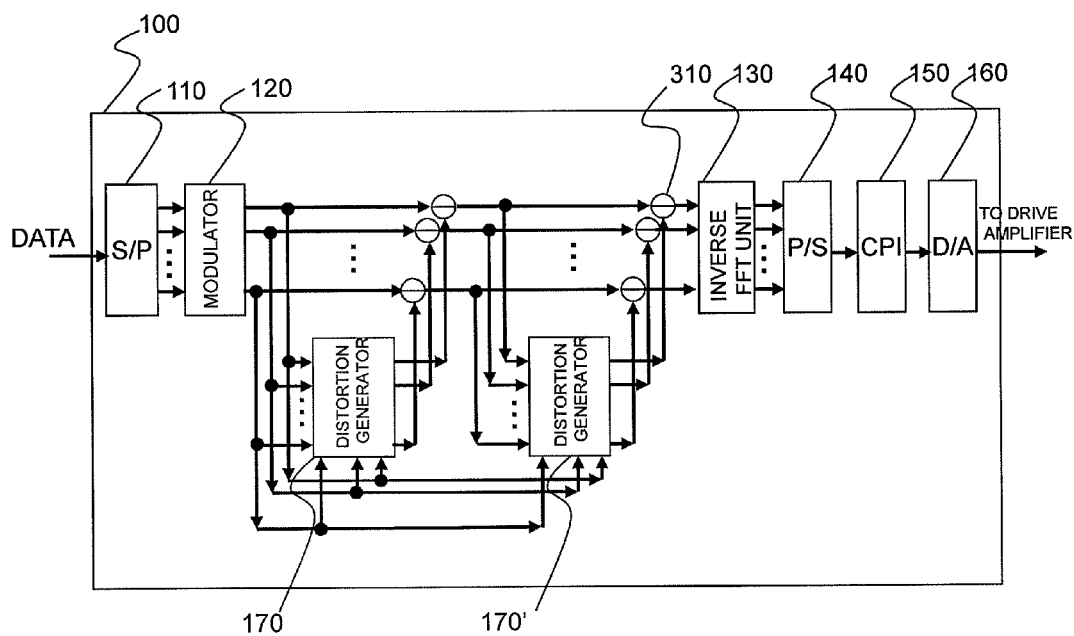
FIG. 7 is a functional block diagram of a transmission signal processor within a transmitter according to a second embodiment.
Figure 8:
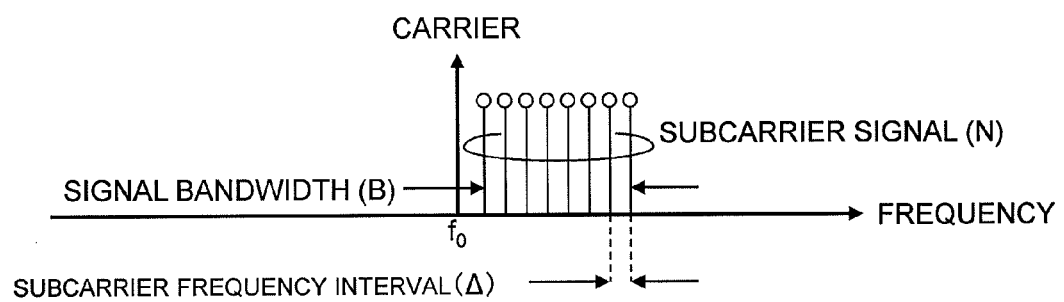
FIG. 8 is a schematic diagram of an optical spectrum of an optical OFDM signal.
Figure 9:
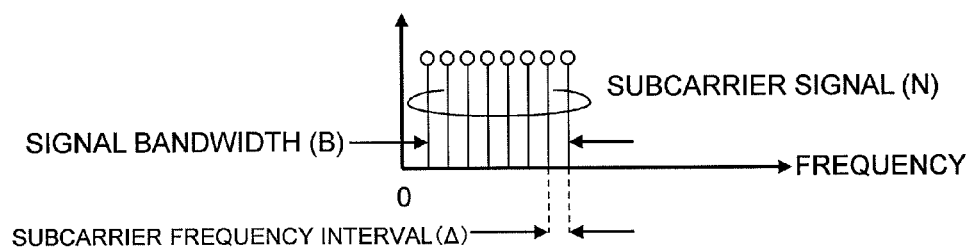
FIG. 9 is a schematic diagram of a spectrum of a baseband OFDM signal.
Figure 10:
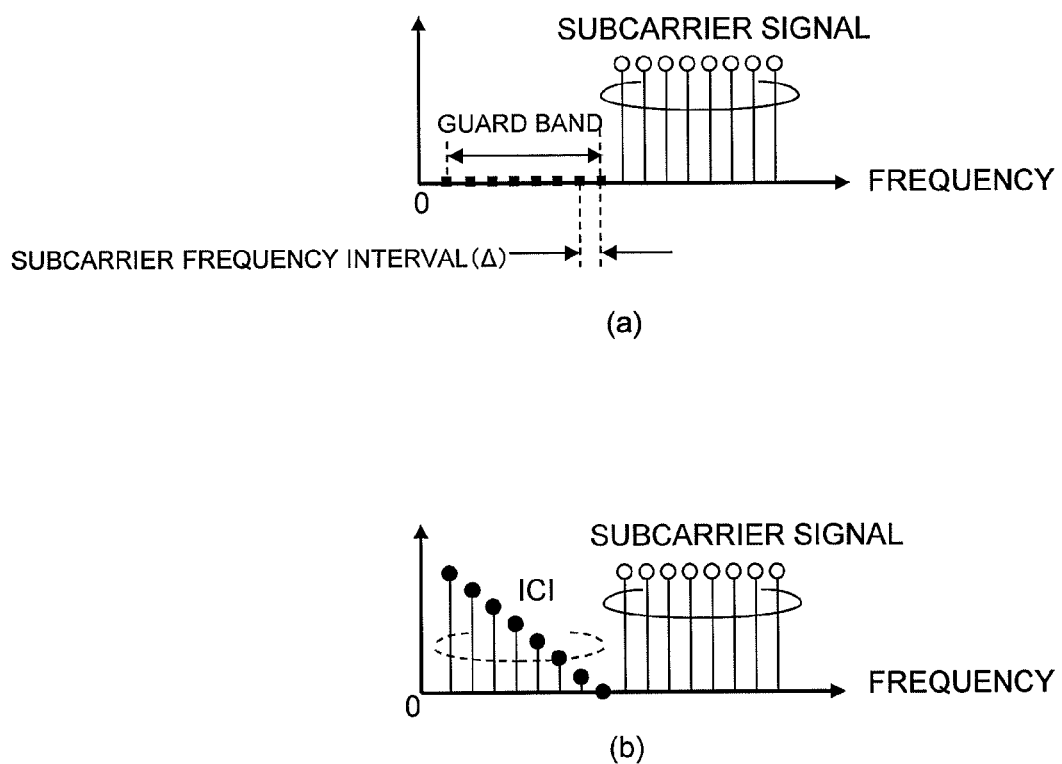
FIGS. 10A and 10B are schematic diagrams of transmission and reception spectrums of the baseband OFDM signal in a first technique avoiding inter-subcarrier interference.
Figure 11:
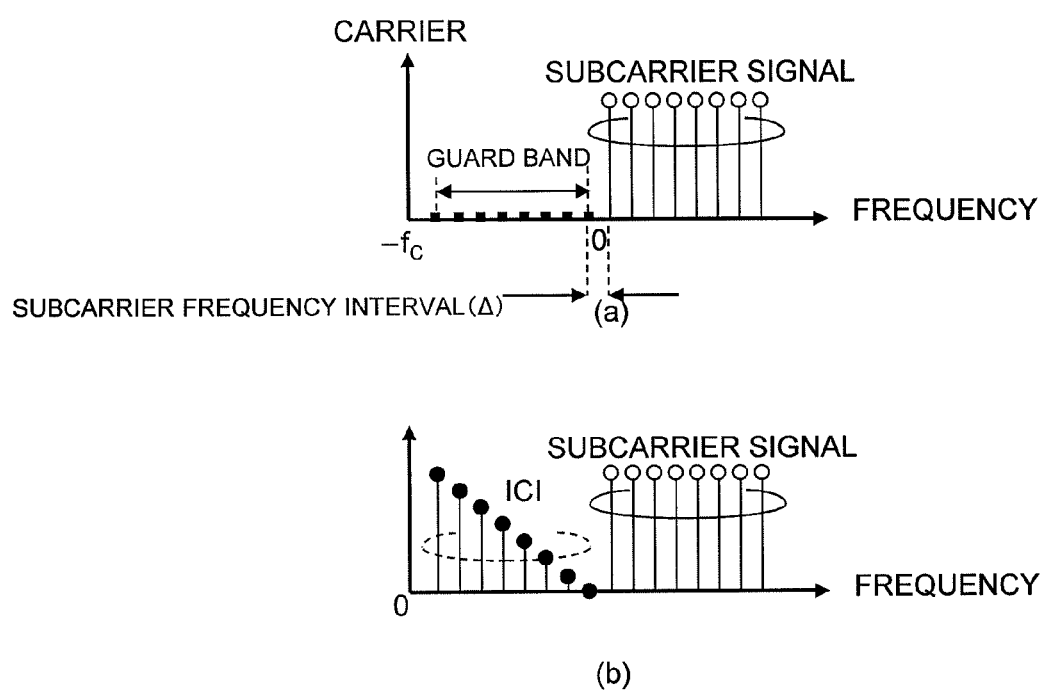
FIGS. 11A and 11B are schematic diagrams of transmission and reception spectrums of the baseband OFDM signal in a second technique avoiding the inter-subcarrier interference.
Figure 12:
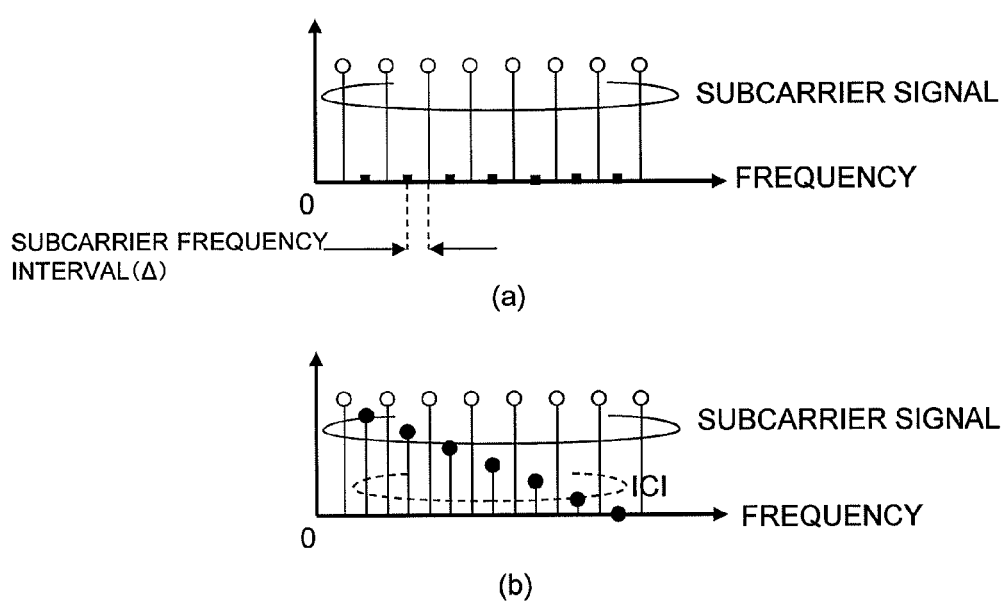
FIGS. 12A and 12B are schematic diagrams of a transmission and reception spectrums of the baseband OFDM signal in a third technique avoiding the inter-subcarrier interference.

A second embodiment will be described with reference to FIG. 7. FIG. 7 illustrates a configuration diagram of the transmission signal processor 100 of the transmitter 1 according to the second embodiment. The same configurations as those in the first embodiment are denoted by identical reference symbols, and their description will be omitted. The overall configuration of the system is identical with those of the first embodiment.

The transmission signal processor 100 according to this embodiment further includes a distortion generator 170' and subtractors 310. In this embodiment, the distortion generator 170 used in the first embodiment is used twice (distortion generators 170 and 170' in FIG. 7). The distortion generators 170 and 170' can have the same configuration. A residual distortion (corresponding to a term of $|c_2|^2/|c_0|^2$ on a right side of the above Formula (10)) attributable to the inter-subcarrier interference, which cannot be removed by the aid of the distortion generator 170 is further generated by the distortion generator 170'. The generated distortion components are further subtracted from the output signals of the subtractors 300 in the subtractors 310, and the obtained signals are transmitted as the optical OFDM signals. The receiver is identical in the configuration with the conventional receiver 6 for the optical OFDM communication illustrated in FIG. 3. As understood from the signal point arrangement of the reception signal with the distortion generator in FIG. 15, there is a case in which the residual distortion remains even with the use of the distortion generator 170. Under the circumstances, the residual distortion is further generated by the distortion generator 170', and subtracted from the output signal of the subtractors 300 to further reduce the residual distortion at the reception time.

Figure 16:
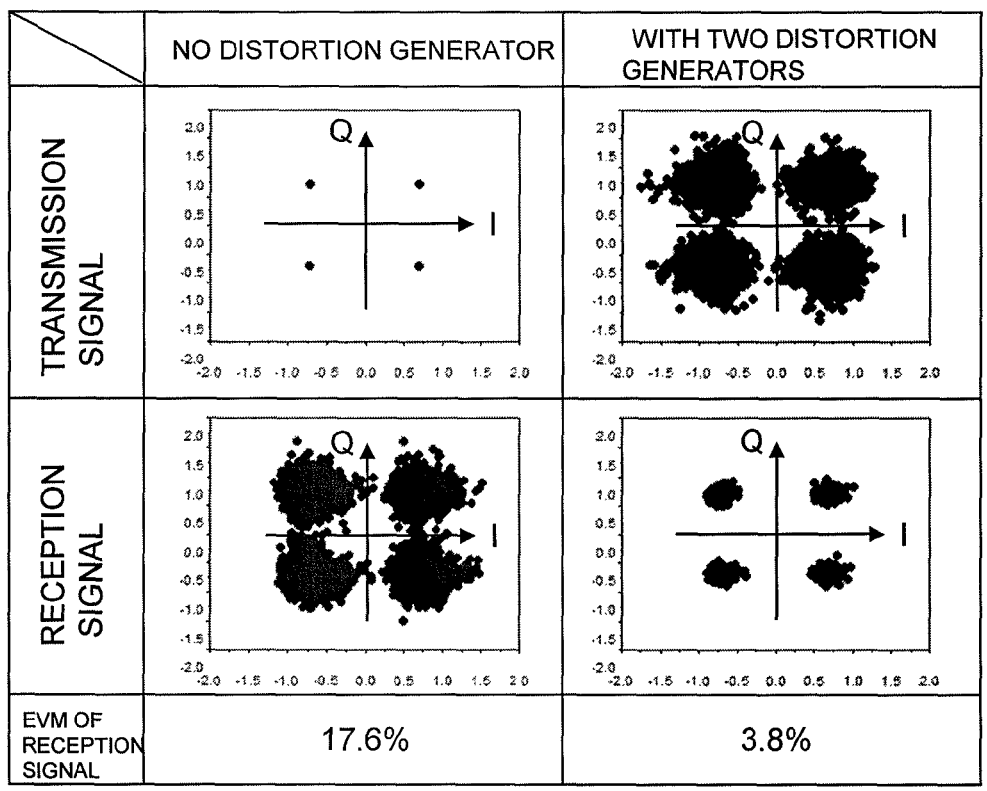
FIG. 16 is a distribution diagram of signal points of transmission and reception signals on an IQ plane according to the second embodiment.

FIG. 16 illustrates results of verifying the effects of this embodiment through simulation. A column indicative of "no distortion generator" represents the signal point arrangement of the transmission signal and the reception signal on the IQ plane when the conventional optical OFDM communication system is used. This is identical with that with no distortion generator in FIG. 15 of the first embodiment. The signal point arrangement of the transmission signal and the reception signal according to this embodiment is illustrated in a column indicative of "with two distortion generators". As is understood from FIG. 15, the distortion caused by the inter-subcarrier interference is apparently reduced, and the value of the EVM can be reduced from 17.6% to 3.8%. Further, as compared with the results of the first embodiment illustrated in FIG. 15, the EVM is 6.6% in the system using one distortion generator, but improved to 3.8% in the system using two distortion generators. Hence, the effects of this embodiment can be verified.

This embodiment has such a feature that the distortion attributable to the inter-subcarrier interference can be further reduced as compared with the first embodiment. In this embodiment, the distortion generator 170 is used twice, but may be used many times so far as the distortion component is reduced.

3. Third Embodiment

A third embodiment will be described with reference to FIGS. 13 and 17. The overall configuration of the system is identical with that of the first embodiment. The same configurations as those in the first embodiment are denoted by identical reference symbols, and their description will be omitted.

Figure 13:
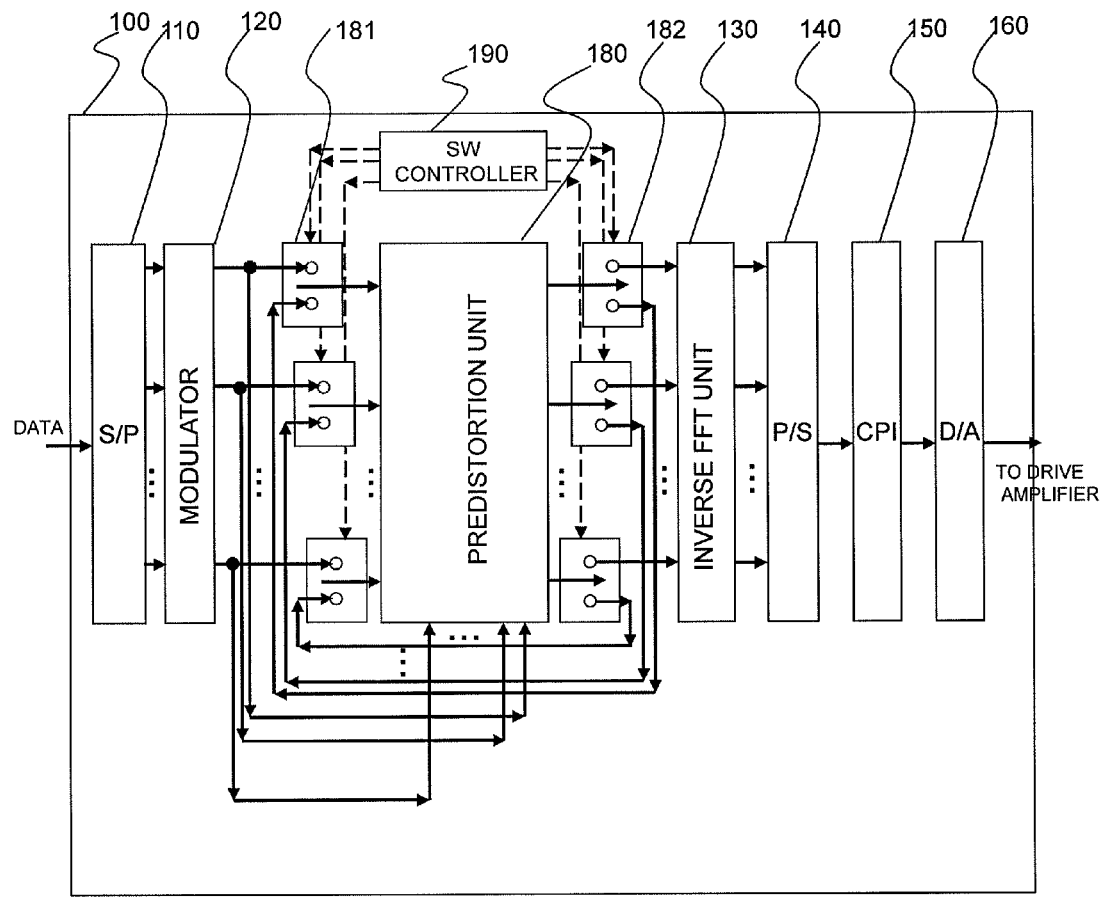
FIG. 13 is a functional block diagram of a transmission signal processor within a transmitter according to a third embodiment.

FIG. 13 illustrates a configuration diagram of a transmission signal processor according to the third embodiment.

The transmission signal processor 100 according to the third embodiment includes, for example, the serial-parallel converter (S/P) 110, the subcarrier modulator 120, the inverse FFT unit 130, the parallel-serial converter (P/S) 140, the cyclic prefix insertion unit (CPI) 150, the digital-analog converter (DA converter) 160, a predistortion unit 180, 2:1 switches (first switches) 181 and 1:2 switches (second switches) 182 corresponding to the subcarriers, and a switch controller 190.

Figure 14:
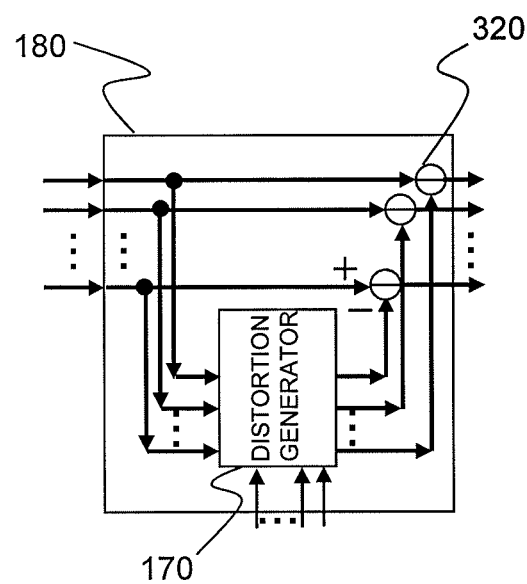
FIG. 14 is a functional block diagram of a predistortion unit of the transmission signal processor within the transmitter according to the third embodiment.

FIG. 14 is a configuration diagram of the predistortion unit 180 according to this embodiment.

The predistortion unit 180 includes, for example, the distortion generator 170 and subtractors 320.

The transmission signal processor 100 within the transmitter 1 converts data to be originally communicated into parallel data by the serial-parallel converter 110, and modulates the subcarrier with the parallel data by the subcarrier modulator 120. The respective converted sub-carrier signals are input to the predistortion unit 180 through the 2:1 switches 181. The predistortion unit 180 divides each input signal into two signals, and allows one signal to be input to the distortion generator 170. The distortion generator 170 has the same configuration as that in FIG. 2, and generates the distortion component δk from the input signal, and outputs the distortion component δk. The predistortion unit 180 subtracts the distortion component δk that is an output signal of the distortion generator 170 from the input signal divided into two by each of the subtractors 320, and outputs the subtracted signals. Outputs of the predistortion unit 180 are guided to the inverse FFT unit 130 through the 2:1 switches 182, converted into time data by the inverse FFT unit 130, and output as serial data by the parallel-serial converter 140. A cyclic prefix is added to the signal by the cyclic prefix insertion unit 150, and this digital data is converted into an analog signal by the DA converter 160, and sent to a driver amplifier. The subsequent processing till restoration of data from the receiver is identical with that in other embodiments.

In this embodiment, the residual distortion can be reduced by using the predistortion unit 180 plural times. A case in which the predistortion unit 180 is used twice will be described. In this case, respective steps are conducted as follows. First, in a first step, the respective symbols are guided to the predistortion units 180. In this situation, each of the 2:1 switches 181 is set to guide a modulator output to an input of the predistortion unit 180 according to a control signal from the switch controller 190. When each of the 2:1 switches 181 guides an output (ck) of the subcarrier modulator 120 to the predistortion unit 180, a signal (ck-δk) obtained by subtracting the distortion component (δk) generated by photoelectric conversion from the signal (ck) to be originally communicated is output from the predistortion unit 180. In a subsequent step, each of the 1:2 switches 182 is set to guide the signal (ck-δk) to each of the 2:1 switches 181 according to the control signal from the switch controller 190, and each of the 2:1 switches 181 is set to again guide this signal to the input of the predistortion unit 180. The predistortion unit 180 calculates the distortion component generated by photoelectric conversion with the use of the input signal (ck-δk), and outputs a signal from which the distortion component is subtracted. The signal that has thus passed through the predistortion unit 180 twice passes through each of the 1:2 switches 182 controlled according to the control signal from the switch controller 190 in a subsequent step, and is guided to the inverse FFT unit 130 and so on. Accordingly, the signal from which the distortion is subtracted twice by the predistortion unit 180 is transmitted. The same is applied to a case in which the distortion is generated three or more times, and plural distortion components δ1k, δ2k, . . . are sequentially subtracted from the subcarrier signal output from the subcarrier modulator 120.

Timing of the respective steps can be so controlled as to repeat the generation of the distortion component by the distortion generator 170 and the subtraction by the subtractors 320 by a given number of times according to a symbol clock (or its integral multiple) by the switch controller 190.

This embodiment has such a feature that the configuration of the signal processor is simpler than that in the second embodiment, and the circuit scale is not increased even if the distortion generator is used plural times.

INDUSTRIAL APPLICABILITY

The present invention is applicable to, for example, the optical OFDM communication system that conducts the photoelectric conversion and the direct detection at the receiver side.

The invention claimed is:

1. An optical transmitter in an optical OFDM communication system in which the optical transmitter maps digital data to a plurality of subcarriers orthogonal to each other over a symbol time, modulates subcarrier signals, and transmits modulated subcarrier signals as optical signals through an optical fiber, and an optical receiver applies a photoelectric conversion to the optical signals propagated through the optical fiber by a photodiode to receive the optical signals by a direct detection, and demodulates the subcarrier signals to reproduce original digital data, the optical transmitter comprising:
a modulator that maps the digital data to the plurality of subcarriers orthogonal to each other over the symbol time, modulates the subcarrier signals, and outputs the modulated subcarrier signals,
a distortion generator that applies an inverse FFT computation to the subcarrier signals to generate a baseband OFDM signal, and squares an absolute value of the baseband OFDM signal to generate a distortion component caused by inter-subcarrier interference;

a subtractor that subtracts the distortion component generated by the distortion generator from each of the subcarrier signals output from the modulator to obtain a transmission signal;

an inverse FFT unit that applies the inverse FFT computation to the transmission signal which is subtracted the distortion component to convert the transmission signal into a time signal; and a transmitter unit that transmits the optical signal based on the transmission signal converted by the inverse FFT unit to the optical receiver through the optical fiber.

2. The optical transmitter according to claim 1,
wherein the distortion generator comprises:
a second inverse FFT unit that applies the inverse FFT computation to each of the subcarrier signals from the modulator to obtain the baseband OFDM signal;
a squaring unit that squares the absolute value of the baseband OFDM signal;
an FFT unit that applies an FFT computation to a computation result by the squaring unit to convert the computation result into signals for each of the subcarriers; and
a second subtractor that subtracts the subcarrier signal from the modulator, from the signal converted by the FFT unit to obtain a distortion signal.

3. The optical transmitter according to claim 2,
wherein the distortion generator further comprises:
a parallel-serial converter that converts the baseband OFDM signal converted by the second inverse FFT unit into a serial signal, and outputs the serial signal to the squaring unit; and
a serial-parallel converter that converts the computation result by the squaring unit into a parallel signal, and outputs the parallel signal to the FFT unit.

4. The optical transmitter according to claim 1, further comprising:
a second distortion generator that applies the inverse FFT computation to the transmission signal obtained by the subtractor to generate the baseband OFDM signal, squares the absolute value of the baseband OFDM signal to generate a second distortion component caused by inter-subcarrier interference of the transmission signal; and
a third subtractor that subtracts the second distortion component generated by the second distortion generator from an output of the subtractor to obtain the transmission signal,
wherein the inverse FFT unit applies the inverse FFT computation to the transmission signal which are subtracted the distortion component and the second distortion component to convert the transmission signal into a time signal.

5. An optical transmitter in an optical OFDM communication system in which the optical transmitter maps digital data to a plurality of subcarriers orthogonal to each other over a symbol time, modulates subcarrier signals, and transmits modulated subcarrier signals as optical signals through an optical fiber, and an optical receiver applies a photoelectric conversion to the optical signals propagated through the optical fiber by a photodiode to receive the optical signals by direct detection, and demodulates the subcarrier signals to reproduce original digital data,
the optical transmitter comprising:
a modulator that maps the digital data to the plurality of subcarriers orthogonal to each other over the symbol time, modulates the subcarrier signals, and outputs the modulated subcarrier signals, a predistortion unit that generates a transmission signal from which a distortion component caused by inter-subcarrier interference is subtracted;

an inverse FFT unit that applies an inverse FFT computation to the transmission signal to generate a baseband OFDM signal;

a transmitter unit that transmits the optical signal based on the baseband OFDM signal generated by the inverse FFT unit to the optical receiver through the optical fiber;

a first switch that selects any one of an output of the modulator and an output of the predistortion unit, and guides selected output to an input of the predistortion unit;

a second switch that selectively guides the output of the predistortion unit to any one of an input of the inverse FFT unit and the input of the predistortion unit; and a switch controller that switches the first and second switches, wherein the predistortion unit guides a signal input through the first switch to a distortion generator that squares an absolute value of the signal to generate the distortion component, and subtracts an output of the distortion generator from input signal of the predistortion unit to generate a new transmission signal.

6. The optical transmitter according to claim 5,
wherein the switch controller, on the basis of the symbol time,
first sets the first switch so as to guide a signal from the modulator to the predistortion unit,
then sets the second switch and the first switch so as to allow the signal that has passed through the predistortion unit to pass through the predistortion unit by a predetermined number of times, and
further sets the second switch so as to guide the signal that has passed through the predistortion unit by the predetermined number of times to the inverse FFT unit.

7. The optical transmitter according to claim 5,
wherein the predistortion unit outputs a signal subtracted the distortion component from the input signal and, by being input the output signal to the predistortion unit again, further subtracts a second distortion component from the signal which is subtracted the distortion component, and
wherein the switch controller switches the second switch to guide an output of the predistortion unit which is subtracted the second distortion component to the FFT unit.

8. The optical transmitter according to claim 5,
wherein the predistortion unit subtracts the distortion component output by the distortion generator on the basis of the input signal from the input signal by a subtractor, and outputs a subtracted signal.

9. An optical OFDM communication system comprising:
an optical transmitter that maps digital data to a plurality of subcarriers orthogonal to each other over a symbol time, modulates subcarrier signals, and transmits modulated subcarrier signals as optical signals through an optical fiber; and
an optical receiver that applies a photoelectric conversion to the optical signals propagated through the optical fiber by a photodiode to receive the optical signals by a direct detection, and demodulates the subcarrier signals to reproduce original digital data,
wherein the optical transmitter comprises:
a modulator that maps the digital data to the plurality of subcarriers orthogonal to each other over the symbol time, modulates the subcarrier signals, and outputs the modulated subcarrier signals, a distortion generator that applies an inverse FFT computation to the subcarrier signals to generate a baseband OFDM signal, and squares an absolute value of the baseband OFDM signal to generate a distortion component caused by inter-subcarrier interference;

a subtractor that subtracts the distortion component generated by the distortion generator from each of the subcarrier signals output from the modulator to obtain a transmission signal;

an inverse FFT unit that applies the inverse FFT computation to the transmission signal which is subtracted the distortion component to convert the transmission signal into a time signal; and a transmitter unit that transmits the optical signal based on the transmission signal converted by the inverse FFT unit to the optical receiver through the optical fiber.

10. The optical OFDM communication system according to claim 9, further comprising:

a second distortion generator that applies the inverse FFT computation to the transmission signal obtained by the subtractor to generate the baseband OFDM signal, squares the absolute value of the baseband OFDM signal to generate a second distortion component caused by inter-subcarrier interference of the transmission signal; and a third subtractor that subtracts the second distortion component generated by the second distortion generator from an output of the subtractor to obtain the transmission signal, wherein the inverse FFT unit applies the inverse FFT computation to the transmission signal which are subtracted the distortion component and the second distortion component to convert the transmission signal into a time signal.

* * * * *